(12) United States Patent
Poulsen et al.

(10) Patent No.: US 10,395,559 B2
(45) Date of Patent: Aug. 27, 2019

(54) SURGICAL TRAINING MODEL FOR TRANSLUMINAL LAPAROSCOPIC PROCEDURES

(71) Applicant: Applied Medical Resources Corporation, Rancho Santa Margarita, CA (US)

(72) Inventors: Nikolai Poulsen, Rancho Santa Margarita, CA (US); Tracy Breslin, Rancho Santa Margarita, CA (US); Jacqueline DeMarchi, Rancho Santa Margarita, CA (US)

(73) Assignee: Applied Medical Resources Corporation, Rancho Santa Margarita, CA (US)

( * ) Notice: Subject to any disclaimer, the term of this patent is extended or adjusted under 35 U.S.C. 154(b) by 356 days.

(21) Appl. No.: 14/039,283

(22) Filed: Sep. 27, 2013

(65) Prior Publication Data

US 2014/0093854 A1    Apr. 3, 2014

Related U.S. Application Data

(60) Provisional application No. 61/707,581, filed on Sep. 28, 2012.

(51) Int. Cl.
*G09B 23/30* (2006.01)
*G09B 23/28* (2006.01)

(52) U.S. Cl.
CPC .......... *G09B 23/285* (2013.01); *G09B 23/28* (2013.01); *G09B 23/30* (2013.01)

(58) Field of Classification Search
None
See application file for complete search history.

(56) References Cited

U.S. PATENT DOCUMENTS 184,573 A    11/1876  Becker
2,127,774 A   8/1938  Jacobson
(Continued)

FOREIGN PATENT DOCUMENTS

CN    2421706 Y    2/2001
CN    2751372 Y    1/2006
(Continued)

OTHER PUBLICATIONS

European Patent Office, International Search Report for International Application No. PCT/US2011/053859 A3, dated May 4, 2012, entitled "Portable Laparoscopic Trainer".
(Continued)

*Primary Examiner* — James B Hull
(74) *Attorney, Agent, or Firm* — Shirin Bozorgui

(57) ABSTRACT

A model for practicing laparoscopic surgical skills is provided. The model comprises a body having an elongate lumen and a plurality of eyelets connected to an inner surface of the lumen. The plurality of eyelets defines at least one pathway for practicing the passing of at least one needle and suture through the eyelets. The model further includes a staging area with removable objects having apertures configured to be placed onto hook-like eyelets. The model provides a platform for practicing hand-to-hand transfer, depth perception among other skills required in laparoscopic procedures within a confined tubular space. The model may be placed inside a laparoscopic trainer in which the practice is performed in a simulated laparoscopic environment and observed on a video display.

9 Claims, 4 Drawing Sheets

(56) References Cited

U.S. PATENT DOCUMENTS

| | | |
|---|---|---|
| 2,284,888 A | 6/1942 | Arnell, Jr. |
| 2,324,702 A | 7/1943 | Hoffman et al. |
| 2,345,489 A | 3/1944 | Lord |
| 2,495,568 A | 1/1950 | Coel |
| 3,766,666 A | 10/1973 | Stroop |
| 3,775,865 A | 12/1973 | Rowan |
| 3,789,518 A | 2/1974 | Chase |
| 3,921,311 A | 11/1975 | Beasley et al. |
| 3,991,490 A | 11/1976 | Markman |
| 4,001,951 A | 1/1977 | Fasse |
| 4,001,952 A | 1/1977 | Kleppinger |
| 4,321,047 A | 3/1982 | Landis |
| 4,323,350 A | 4/1982 | Bowden, Jr. |
| 4,332,569 A | 6/1982 | Burbank |
| 4,371,345 A | 2/1983 | Palmer et al. |
| 4,386,917 A | 6/1983 | Forrest |
| 4,459,113 A | 7/1984 | Boscaro Gatti et al. |
| 4,481,001 A | 11/1984 | Graham et al. |
| 4,596,528 A | 6/1986 | Lewis et al. |
| 4,726,772 A | 2/1988 | Amplatz |
| 4,737,109 A | 4/1988 | Abramson |
| 4,789,340 A | 12/1988 | Zikria |
| 4,832,978 A | 5/1989 | Lesser |
| 4,867,686 A | 9/1989 | Goldstein |
| 4,907,973 A | 3/1990 | Hon |
| 4,938,696 A | 7/1990 | Foster et al. |
| 4,940,412 A | 7/1990 | Blumenthal |
| 5,061,187 A | 10/1991 | Jerath |
| 5,083,962 A | 1/1992 | Pracas |
| 5,104,328 A | 4/1992 | Lounsbury |
| 5,149,270 A | 9/1992 | McKeown |
| 5,180,308 A | 1/1993 | Garito et al. |
| 5,230,630 A | 7/1993 | Burgett |
| 5,273,435 A | 12/1993 | Jacobson |
| 5,295,694 A | 3/1994 | Levin |
| 5,310,348 A | 5/1994 | Miller |
| 5,318,448 A | 6/1994 | Garito et al. |
| 5,320,537 A | 6/1994 | Watson |
| 5,358,408 A | 10/1994 | Medina |
| 5,368,487 A | 11/1994 | Medina |
| 5,380,207 A | 1/1995 | Siepser |
| 5,403,191 A | 4/1995 | Tuason |
| 5,425,644 A | 6/1995 | Szinicz |
| 5,425,731 A | 6/1995 | Daniel et al. |
| 5,472,345 A | 12/1995 | Eggert |
| 5,518,406 A | 5/1996 | Waters |
| 5,518,407 A | 5/1996 | Greenfield et al. |
| 5,520,633 A | 5/1996 | Costin |
| 5,541,304 A | 7/1996 | Thompson |
| 5,620,326 A | 4/1997 | Younker |
| 5,720,742 A | 2/1998 | Zacharias |
| 5,722,836 A | 3/1998 | Younker |
| 5,727,948 A | 3/1998 | Jordan |
| 5,743,730 A | 4/1998 | Clester et al. |
| 5,762,458 A | 6/1998 | Wang et al. |
| 5,769,640 A | 6/1998 | Jacobus et al. |
| 5,775,916 A | 7/1998 | Cooper et al. |
| 5,785,531 A | 7/1998 | Leung |
| 5,800,178 A | 9/1998 | Gillio |
| 5,803,746 A | 9/1998 | Barrie et al. |
| 5,807,378 A | 9/1998 | Jensen et al. |
| 5,810,880 A | 9/1998 | Jensen et al. |
| 5,814,038 A | 9/1998 | Jensen et al. |
| 5,850,033 A | 12/1998 | Mirzeabasov et al. |
| 5,855,583 A | 1/1999 | Wang et al. |
| 5,873,732 A | 2/1999 | Hasson |
| 5,873,863 A | 2/1999 | Komlosi |
| 5,908,302 A | 6/1999 | Goldfarb |
| 5,947,743 A * | 9/1999 | Hasson ............... G09B 23/286 434/262 |
| 5,951,301 A | 9/1999 | Younker |
| 6,080,181 A | 6/2000 | Jensen et al. |
| 6,083,008 A | 7/2000 | Yamada et al. |
| 6,113,395 A | 9/2000 | Hon |
| 6,234,804 B1 | 5/2001 | Yong |
| 6,336,812 B1 | 1/2002 | Cooper et al. |
| 6,398,557 B1 * | 6/2002 | Hoballah ............... G09B 23/28 434/262 |
| 6,413,264 B1 | 7/2002 | Jensen et al. |
| 6,474,993 B1 | 11/2002 | Grund et al. |
| 6,485,308 B1 | 11/2002 | Goldstein |
| 6,488,507 B1 | 12/2002 | Stoloff et al. |
| 6,497,902 B1 | 12/2002 | Ma |
| 6,511,325 B1 | 1/2003 | Lalka et al. |
| 6,517,354 B1 | 2/2003 | Levy |
| 6,568,941 B1 | 5/2003 | Goldstein |
| 6,620,174 B2 | 9/2003 | Jensen et al. |
| 6,654,000 B2 | 11/2003 | Rosenberg |
| 6,659,776 B1 | 12/2003 | Aumann et al. |
| 6,773,263 B2 | 8/2004 | Nicholls et al. |
| 6,780,016 B1 | 8/2004 | Toly |
| 6,817,973 B2 | 11/2004 | Merril et al. |
| 6,820,025 B2 | 11/2004 | Bachmann et al. |
| 6,854,976 B1 | 2/2005 | Suhr |
| 6,857,878 B1 | 2/2005 | Chosack et al. |
| 6,863,536 B1 | 3/2005 | Fisher et al. |
| 6,866,514 B2 | 3/2005 | Von Roeschlaub et al. |
| 6,887,082 B2 | 5/2005 | Shun |
| 6,929,481 B1 | 8/2005 | Alexander et al. |
| 6,939,138 B2 | 9/2005 | Chosack et al. |
| 6,950,025 B1 | 9/2005 | Nguyen |
| 6,960,617 B2 | 11/2005 | Omidian et al. |
| 6,997,719 B2 | 2/2006 | Wellman et al. |
| 7,008,232 B2 | 3/2006 | Brassel |
| 7,018,327 B1 | 3/2006 | Conti |
| 7,025,064 B2 | 4/2006 | Wang et al. |
| 7,056,123 B2 | 6/2006 | Gregorio et al. |
| 7,080,984 B1 | 7/2006 | Cohen |
| 7,118,582 B1 | 10/2006 | Wang et al. |
| 7,255,565 B2 | 8/2007 | Keegan |
| 7,269,532 B2 | 9/2007 | David et al. |
| 7,272,766 B2 | 9/2007 | Sakezles |
| 7,300,450 B2 | 11/2007 | Vleugels et al. |
| 7,364,582 B2 | 4/2008 | Lee |
| 7,404,716 B2 | 7/2008 | Gregorio et al. |
| 7,419,376 B2 | 9/2008 | Sarvazyan et al. |
| 7,427,199 B2 | 9/2008 | Sakezles |
| 7,431,189 B2 | 10/2008 | Shelton, IV et al. |
| 7,441,684 B2 | 10/2008 | Shelton, IV et al. |
| 7,465,168 B2 | 12/2008 | Allen et al. |
| 7,467,075 B2 | 12/2008 | Humphries et al. |
| 7,544,062 B1 | 6/2009 | Hauschild et al. |
| 7,549,866 B2 | 6/2009 | Cohen et al. |
| 7,553,159 B1 | 6/2009 | Arnal et al. |
| 7,575,434 B2 | 8/2009 | Palakodeti |
| 7,594,815 B2 | 9/2009 | Toly |
| 7,621,749 B2 | 11/2009 | Munday |
| 7,646,901 B2 | 1/2010 | Murphy et al. |
| 7,648,367 B1 | 1/2010 | Makower et al. |
| 7,648,513 B2 | 1/2010 | Green et al. |
| 7,651,332 B2 | 1/2010 | Dupuis et al. |
| 7,677,897 B2 | 3/2010 | Sakezles |
| 7,775,916 B1 | 8/2010 | Mahoney |
| 7,780,451 B2 | 8/2010 | Willobee et al. |
| 7,802,990 B2 | 9/2010 | Korndorffer et al. |
| 7,803,151 B2 | 9/2010 | Whitman |
| 7,806,696 B2 | 10/2010 | Alexander et al. |
| 7,819,799 B2 | 10/2010 | Merril et al. |
| 7,833,018 B2 | 11/2010 | Alexander et al. |
| 7,837,473 B2 | 11/2010 | Koh |
| 7,850,454 B2 | 12/2010 | Toly |
| 7,850,456 B2 | 12/2010 | Chosack et al. |
| 7,854,612 B2 | 12/2010 | Frassica et al. |
| 7,857,626 B2 | 12/2010 | Toly |
| 7,866,983 B2 | 1/2011 | Hemphill et al. |
| 7,931,470 B2 | 4/2011 | Alexander et al. |
| 7,931,471 B2 | 4/2011 | Senagore et al. |
| 7,988,992 B2 | 8/2011 | Omidian et al. |
| 7,993,140 B2 | 8/2011 | Sakezles |
| 7,997,903 B2 | 8/2011 | Hasson et al. |
| 8,007,281 B2 | 8/2011 | Toly |
| 8,007,282 B2 | 8/2011 | Gregario et al. |
| 8,016,818 B2 | 9/2011 | Ellis et al. |
| 8,021,162 B2 | 9/2011 | Sui |

(56) References Cited

U.S. PATENT DOCUMENTS

| | | |
|---|---|---|
| 8,048,088 B2 | 11/2011 | Green et al. |
| 8,083,691 B2 | 12/2011 | Goldenberg et al. |
| 8,116,847 B2 | 2/2012 | Gattani et al. |
| 8,137,110 B2 | 3/2012 | Sakezles |
| 8,157,145 B2 | 4/2012 | Shelton, IV et al. |
| 8,197,464 B2 | 6/2012 | Krever et al. |
| 8,205,779 B2 | 6/2012 | Ma et al. |
| 8,221,129 B2 | 7/2012 | Parry et al. |
| 8,297,982 B2 | 10/2012 | Park et al. |
| 8,308,817 B2 | 11/2012 | Egilsson et al. |
| 8,323,028 B2 | 12/2012 | Matanhelia |
| 8,323,029 B2 | 12/2012 | Toly |
| 8,328,560 B2 | 12/2012 | Niblock et al. |
| 8,342,851 B1 | 1/2013 | Speeg et al. |
| 8,403,675 B2 | 3/2013 | Feygin et al. |
| 8,403,676 B2 | 3/2013 | Frassica et al. |
| 8,408,920 B2 | 4/2013 | Speller |
| 8,425,234 B2 | 4/2013 | Sakezles |
| 8,439,687 B1 | 5/2013 | Morriss et al. |
| 8,442,621 B2 | 5/2013 | Gorek et al. |
| 8,454,368 B2 | 6/2013 | Ault et al. |
| 8,459,094 B2 | 6/2013 | Yanni |
| 8,459,520 B2 | 6/2013 | Giordano et al. |
| 8,460,002 B2 | 6/2013 | Wang et al. |
| 8,469,715 B2 | 6/2013 | Ambrozio |
| 8,469,716 B2 | 6/2013 | Fedotov et al. |
| 8,480,407 B2 | 7/2013 | Campbell et al. |
| 8,480,408 B2 | 7/2013 | Ishii et al. |
| 8,491,309 B2 | 7/2013 | Parry et al. |
| 8,500,753 B2 | 8/2013 | Green et al. |
| 8,512,044 B2 | 8/2013 | Sakezles |
| 8,517,243 B2 | 8/2013 | Giordano et al. |
| 8,521,252 B2 | 8/2013 | Diez |
| 8,535,062 B2 | 9/2013 | Nguyen |
| 8,544,711 B2 | 10/2013 | Ma et al. |
| 8,556,635 B2 | 10/2013 | Toly |
| 8,608,483 B2 | 12/2013 | Trotta et al. |
| 8,613,621 B2 | 12/2013 | Henderickson et al. |
| 8,636,520 B2 | 1/2014 | Iwasaki et al. |
| D699,297 S | 2/2014 | Bahsoun et al. |
| 8,641,423 B2 | 2/2014 | Gumkowski |
| 8,647,125 B2 | 2/2014 | Johns et al. |
| 8,678,831 B2 | 3/2014 | Trotta et al. |
| 8,679,279 B2 | 3/2014 | Thompson et al. |
| 8,696,363 B2 | 4/2014 | Gray et al. |
| 8,708,213 B2 | 4/2014 | Shelton, IV et al. |
| 8,708,707 B2 | 4/2014 | Hendrickson et al. |
| 8,764,449 B2 | 7/2014 | Rios et al. |
| 8,764,452 B2 | 7/2014 | Pravong et al. |
| 8,800,839 B2 | 8/2014 | Beetel |
| 8,801,437 B2 | 8/2014 | Mousques |
| 8,801,438 B2 | 8/2014 | Sakezles |
| 8,807,414 B2 | 8/2014 | Ross et al. |
| 8,808,004 B2 | 8/2014 | Misawa et al. |
| 8,808,311 B2 | 8/2014 | Heinrich et al. |
| 8,814,573 B2 | 8/2014 | Nguyen |
| 8,827,988 B2 | 9/2014 | Belson et al. |
| 8,840,628 B2 | 9/2014 | Green et al. |
| 8,870,576 B2 | 10/2014 | Millon et al. |
| 8,888,498 B2 | 11/2014 | Bisaillon et al. |
| 8,893,946 B2 | 11/2014 | Boudreaux et al. |
| 8,911,238 B2 | 12/2014 | Forsythe |
| 8,915,742 B2 | 12/2014 | Hendrickson et al. |
| 8,945,095 B2 | 2/2015 | Blumenkranz et al. |
| 8,961,190 B2 | 2/2015 | Hart et al. |
| 8,966,954 B2 | 3/2015 | Ni et al. |
| 8,968,003 B2 | 3/2015 | Hendrickson et al. |
| 9,008,989 B2 | 4/2015 | Wilson et al. |
| 9,017,080 B1 | 4/2015 | Placik |
| 9,026,247 B2 | 5/2015 | White |
| 9,050,201 B2 | 6/2015 | Egilsson et al. |
| 9,056,126 B2 | 6/2015 | Hersel et al. |
| 9,070,306 B2 | 6/2015 | Rappel et al. |
| 9,087,458 B2 | 7/2015 | Shim et al. |
| 9,117,377 B2 | 8/2015 | Shim et al. |
| 9,119,572 B2 | 9/2015 | Gorek et al. |
| 9,123,261 B2 | 9/2015 | Lowe |
| 9,129,054 B2 | 9/2015 | Nawana et al. |
| 9,196,176 B2 | 11/2015 | Hager et al. |
| 9,226,799 B2 | 1/2016 | Lightcap et al. |
| 9,257,055 B2 | 2/2016 | Endo et al. |
| 9,265,587 B2 | 2/2016 | Vancamberg et al. |
| 9,295,468 B2 | 3/2016 | Heinrich et al. |
| 9,351,714 B2 | 5/2016 | Ross et al. |
| 9,336,694 B2 | 6/2016 | Shim et al. |
| 9,358,682 B2 | 6/2016 | Ruiz Morales |
| 9,364,224 B2 | 6/2016 | Nicholas et al. |
| 9,364,279 B2 | 6/2016 | Houser et al. |
| 9,370,361 B2 | 6/2016 | Viola et al. |
| 9,373,270 B2 | 6/2016 | Miyazaki |
| 9,439,649 B2 | 9/2016 | Shelton, IV et al. |
| 9,439,733 B2 | 9/2016 | Ha et al. |
| 9,449,532 B2 | 9/2016 | Black et al. |
| 9,468,438 B2 | 10/2016 | Baber et al. |
| 2001/0019818 A1 | 9/2001 | Yong |
| 2002/0168619 A1 | 11/2002 | Provenza |
| 2003/0031993 A1 | 2/2003 | Pugh |
| 2003/0091967 A1 | 5/2003 | Chosack et al. |
| 2003/0176770 A1 | 9/2003 | Merril et al. |
| 2004/0005423 A1 | 1/2004 | Dalton et al. |
| 2004/0126746 A1 | 7/2004 | Toly |
| 2004/0248072 A1 | 12/2004 | Gray et al. |
| 2005/0008997 A1 | 1/2005 | Herman |
| 2005/0026125 A1 | 2/2005 | Toly |
| 2005/0084833 A1 | 4/2005 | Lacey et al. |
| 2005/0131390 A1 | 6/2005 | Heinrich et al. |
| 2005/0142525 A1 | 6/2005 | Cotin et al. |
| 2005/0192595 A1 | 9/2005 | Green et al. |
| 2005/0196739 A1 | 9/2005 | Moriyama |
| 2005/0196740 A1 | 9/2005 | Moriyana |
| 2005/0214727 A1 | 9/2005 | Stoianovici et al. |
| 2006/0046235 A1 | 2/2006 | Alexander et al. |
| 2006/0252019 A1 | 11/2006 | Burkitt et al. |
| 2006/0275741 A1 | 12/2006 | Chewning et al. |
| 2007/0074584 A1 | 4/2007 | Talarico et al. |
| 2007/0077544 A1 | 4/2007 | Lemperle et al. |
| 2007/0078484 A1 | 4/2007 | Talarico et al. |
| 2007/0148626 A1 | 6/2007 | Ikeda |
| 2007/0166682 A1 | 7/2007 | Yarin et al. |
| 2007/0197895 A1 | 8/2007 | Nycz et al. |
| 2007/0225734 A1 | 9/2007 | Bell et al. |
| 2007/0275359 A1 | 11/2007 | Rotnes et al. |
| 2008/0032272 A1 | 2/2008 | Palakodeti |
| 2008/0032273 A1 | 2/2008 | Macnamara et al. |
| 2008/0052034 A1 | 2/2008 | David et al. |
| 2008/0064017 A1 | 3/2008 | Grundmeyer, III |
| 2008/0076101 A1 | 3/2008 | Hyde et al. |
| 2008/0097501 A1 | 4/2008 | Blier |
| 2008/0108869 A1 | 5/2008 | Sanders et al. |
| 2008/0187895 A1 | 8/2008 | Sakezles |
| 2008/0188948 A1 | 8/2008 | Flatt |
| 2008/0299529 A1 | 12/2008 | Schaller |
| 2009/0246747 A1 | 1/2009 | Buckman, Jr. |
| 2009/0068627 A1 | 3/2009 | Toly |
| 2009/0142739 A1 | 6/2009 | Wang et al. |
| 2009/0142741 A1 | 6/2009 | Ault et al. |
| 2009/0143642 A1 | 6/2009 | Takahashi et al. |
| 2009/0176196 A1 | 7/2009 | Niblock et al. |
| 2009/0187079 A1 | 7/2009 | Albrecht et al. |
| 2009/0298034 A1 | 12/2009 | Parry et al. |
| 2009/0314550 A1 | 12/2009 | Layton |
| 2010/0047752 A1 | 2/2010 | Chan et al. |
| 2010/0094312 A1 | 4/2010 | Ruiz Morales et al. |
| 2010/0099067 A1 | 4/2010 | Agro |
| 2010/0167248 A1 | 7/2010 | Ryan |
| 2010/0167249 A1 | 7/2010 | Ryan |
| 2010/0167250 A1 | 7/2010 | Ryan et al. |
| 2010/0167253 A1 | 7/2010 | Ryan et al. |
| 2010/0167254 A1 | 7/2010 | Nguyen |
| 2010/0196867 A1 | 8/2010 | Geerligs et al. |
| 2010/0204713 A1 | 8/2010 | Ruiz Morales |
| 2010/0209899 A1 | 8/2010 | Park |
| 2010/0258611 A1 | 10/2010 | Smith et al. |
| 2010/0273136 A1 | 10/2010 | Kandasami et al. |

(56) References Cited

U.S. PATENT DOCUMENTS

| | | |
|---|---|---|
| 2010/0279263 A1 | 11/2010 | Duryea |
| 2010/0324541 A1 | 12/2010 | Whitman |
| 2011/0046637 A1 | 2/2011 | Patel et al. |
| 2011/0046659 A1 | 2/2011 | Ramstein et al. |
| 2011/0087238 A1 | 4/2011 | Wang et al. |
| 2011/0091855 A1 | 4/2011 | Miyazaki |
| 2011/0137337 A1 | 6/2011 | van den Dool et al. |
| 2011/0200976 A1 | 8/2011 | Hou et al. |
| 2011/0207104 A1 | 8/2011 | Trotta |
| 2011/0218550 A1 | 9/2011 | Ma |
| 2011/0244436 A1 | 10/2011 | Campo |
| 2011/0269109 A2 | 11/2011 | Miyazaki |
| 2011/0281251 A1 | 11/2011 | Mousques |
| 2011/0301620 A1 | 12/2011 | Di Betta et al. |
| 2012/0015337 A1 | 1/2012 | Hendrickson et al. |
| 2012/0015339 A1 | 1/2012 | Hendrickson et al. |
| 2012/0016362 A1 | 1/2012 | Heinrich et al. |
| 2012/0028231 A1 | 2/2012 | Misawa et al. |
| 2012/0045743 A1 | 2/2012 | Misawa et al. |
| 2012/0065632 A1 | 3/2012 | Shadduck |
| 2012/0082970 A1* | 4/2012 | Pravong ............. G09B 23/30 434/262 |
| 2012/0100217 A1 | 4/2012 | Green et al. |
| 2012/0115117 A1 | 5/2012 | Marshall |
| 2012/0115118 A1 | 5/2012 | Marshall |
| 2012/0116391 A1 | 5/2012 | Houser et al. |
| 2012/0148994 A1 | 6/2012 | Hori et al. |
| 2012/0164616 A1 | 6/2012 | Endo et al. |
| 2012/0165866 A1 | 6/2012 | Kaiser et al. |
| 2012/0172873 A1 | 7/2012 | Artale et al. |
| 2012/0179072 A1 | 7/2012 | Kegreiss |
| 2012/0202180 A1 | 8/2012 | Stock et al. |
| 2012/0264096 A1 | 10/2012 | Taylor et al. |
| 2012/0264097 A1 | 10/2012 | Newcott et al. |
| 2012/0282583 A1 | 11/2012 | Thaler et al. |
| 2012/0282584 A1 | 11/2012 | Million et al. |
| 2012/0283707 A1 | 11/2012 | Giordano et al. |
| 2012/0288839 A1 | 11/2012 | Crabtree |
| 2012/0308977 A1 | 12/2012 | Tortola |
| 2013/0087597 A1 | 4/2013 | Shelton, IV et al. |
| 2013/0101973 A1 | 4/2013 | Hoke et al. |
| 2013/0105552 A1 | 5/2013 | Weir et al. |
| 2013/0116668 A1 | 5/2013 | Shelton, IV et al. |
| 2013/0157240 A1 | 6/2013 | Hart et al. |
| 2013/0171288 A1 | 7/2013 | Harders |
| 2013/0177890 A1 | 7/2013 | Sakezles |
| 2013/0192741 A1 | 8/2013 | Trotta et al. |
| 2013/0218166 A1 | 8/2013 | Elmore |
| 2013/0224709 A1 | 8/2013 | Riojas et al. |
| 2013/0245681 A1 | 9/2013 | Straehnz et al. |
| 2013/0253480 A1 | 9/2013 | Kimball et al. |
| 2013/0267876 A1 | 10/2013 | Leckenby et al. |
| 2013/0282038 A1 | 10/2013 | Dannaher et al. |
| 2013/0288216 A1 | 10/2013 | Parry, Jr. et al. |
| 2013/0302771 A1 | 11/2013 | Alderete |
| 2013/0324991 A1 | 12/2013 | Clem et al. |
| 2013/0324999 A1 | 12/2013 | Price et al. |
| 2014/0011172 A1 | 1/2014 | Lowe |
| 2014/0017651 A1 | 1/2014 | Sugimoto et al. |
| 2014/0030682 A1 | 1/2014 | Thilenius |
| 2014/0038151 A1 | 2/2014 | Hart |
| 2014/0051049 A1 | 2/2014 | Jarc et al. |
| 2014/0072941 A1 | 3/2014 | Hendrickson et al. |
| 2014/0087345 A1 | 3/2014 | Breslin et al. |
| 2014/0087346 A1 | 3/2014 | Breslin et al. |
| 2014/0087347 A1 | 3/2014 | Tracy et al. |
| 2014/0087348 A1 | 3/2014 | Tracy et al. |
| 2014/0088413 A1 | 3/2014 | Von Bucsh et al. |
| 2014/0093852 A1 | 4/2014 | Poulsen et al. |
| 2014/0093854 A1 | 4/2014 | Poulsen et al. |
| 2014/0099858 A1 | 4/2014 | Hernandez |
| 2014/0106328 A1 | 4/2014 | Loor |
| 2014/0107471 A1 | 4/2014 | Haider et al. |
| 2014/0156002 A1 | 6/2014 | Thompson et al. |
| 2014/0162016 A1 | 6/2014 | Matsui et al. |
| 2014/0170623 A1 | 6/2014 | Jarstad et al. |
| 2014/0186809 A1 | 7/2014 | Hendrickson et al. |
| 2014/0200561 A1 | 7/2014 | Ingmanson et al. |
| 2014/0212861 A1 | 7/2014 | Romano |
| 2014/0220527 A1 | 8/2014 | Li et al. |
| 2014/0220530 A1 | 8/2014 | Merkle et al. |
| 2014/0220532 A1 | 8/2014 | Ghez et al. |
| 2014/0242564 A1 | 8/2014 | Pravong et al. |
| 2014/0246479 A1 | 9/2014 | Baber et al. |
| 2014/0248596 A1 | 9/2014 | Hart et al. |
| 2014/0263538 A1 | 9/2014 | Leimbach et al. |
| 2014/0272878 A1 | 9/2014 | Shim et al. |
| 2014/0272879 A1 | 9/2014 | Shim et al. |
| 2014/0275795 A1 | 9/2014 | Little et al. |
| 2014/0275981 A1 | 9/2014 | Selover et al. |
| 2014/0277017 A1 | 9/2014 | Leimbach et al. |
| 2014/0303643 A1 | 10/2014 | Ha et al. |
| 2014/0303646 A1 | 10/2014 | Morgan et al. |
| 2014/0303660 A1 | 10/2014 | Boyden et al. |
| 2014/0308643 A1 | 10/2014 | Trotta et al. |
| 2014/0342334 A1 | 11/2014 | Black et al. |
| 2014/0349266 A1 | 11/2014 | Choi |
| 2014/0350530 A1 | 11/2014 | Ross et al. |
| 2014/0357977 A1 | 12/2014 | Zhou |
| 2014/0370477 A1 | 12/2014 | Black et al. |
| 2014/0371761 A1 | 12/2014 | Juanpera |
| 2014/0378995 A1 | 12/2014 | Kumar et al. |
| 2015/0031008 A1 | 1/2015 | Black et al. |
| 2015/0037773 A1 | 2/2015 | Quirarte Catano |
| 2015/0038613 A1 | 2/2015 | Sun et al. |
| 2015/0076207 A1 | 3/2015 | Boudreaux et al. |
| 2015/0086955 A1 | 3/2015 | Poniatowski et al. |
| 2015/0132732 A1 | 5/2015 | Hart et al. |
| 2015/0132733 A1 | 5/2015 | Garvik et al. |
| 2015/0135832 A1 | 5/2015 | Blumenkranz et al. |
| 2015/0148660 A1 | 5/2015 | Weiss et al. |
| 2015/0164598 A1 | 6/2015 | Blumenkranz et al. |
| 2015/0187229 A1 | 7/2015 | Wachli et al. |
| 2015/0194075 A1 | 7/2015 | Rappel et al. |
| 2015/0202299 A1 | 7/2015 | Burdick et al. |
| 2015/0209035 A1 | 7/2015 | Zemlock |
| 2015/0209059 A1 | 7/2015 | Trees et al. |
| 2015/0209573 A1 | 7/2015 | Hibner et al. |
| 2015/0228206 A1 | 8/2015 | Shim et al. |
| 2015/0262511 A1 | 9/2015 | Lin et al. |
| 2015/0265431 A1 | 9/2015 | Egilsson et al. |
| 2015/0272571 A1 | 10/2015 | Leimbach et al. |
| 2015/0272574 A1 | 10/2015 | Leimbach et al. |
| 2015/0272580 A1 | 10/2015 | Leimbach et al. |
| 2015/0272581 A1 | 10/2015 | Leimbach et al. |
| 2015/0272583 A1 | 10/2015 | Leimbach et al. |
| 2015/0272604 A1 | 10/2015 | Chowaniec et al. |
| 2015/0332609 A1 | 11/2015 | Alexander |
| 2015/0358426 A1 | 12/2015 | Kimball et al. |
| 2015/0371560 A1 | 12/2015 | Lowe |
| 2015/0374378 A1 | 12/2015 | Giordano et al. |
| 2015/0374449 A1 | 12/2015 | Chowaniec et al. |
| 2016/0000437 A1 | 1/2016 | Giordano et al. |
| 2016/0022374 A1 | 1/2016 | Haider et al. |
| 2016/0030240 A1 | 2/2016 | Gonenc et al. |
| 2016/0031091 A1 | 2/2016 | Popovic et al. |
| 2016/0066909 A1 | 3/2016 | Baber et al. |
| 2016/0070436 A1 | 3/2016 | Thomas et al. |
| 2016/0073928 A1 | 3/2016 | Soper et al. |
| 2016/0074103 A1 | 3/2016 | Sartor |
| 2016/0098933 A1 | 4/2016 | Reiley et al. |
| 2016/0104394 A1 | 4/2016 | Miyazaki |
| 2016/0117956 A1 | 4/2016 | Larsson et al. |
| 2016/0133158 A1 | 5/2016 | Sui et al. |
| 2016/0140876 A1 | 5/2016 | Jabbour et al. |
| 2016/0199059 A1 | 7/2016 | Shelton, IV et al. |
| 2016/0220150 A1 | 8/2016 | Sharonov |
| 2016/0220314 A1 | 8/2016 | Huelman et al. |
| 2016/0225288 A1 | 8/2016 | East et al. |
| 2016/0232819 A1 | 8/2016 | Hofstetter et al. |
| 2016/0235494 A1 | 8/2016 | Shelton, IV et al. |
| 2016/0256187 A1 | 9/2016 | Shelton, IV et al. |
| 2016/0256229 A1 | 9/2016 | Morgan et al. |
| 2016/0262736 A1 | 9/2016 | Ross et al. |

(56) References Cited

U.S. PATENT DOCUMENTS

| | | | |
|---|---|---|---|
| 2016/0262745 A1 | 9/2016 | Morgan et al. | |
| 2016/0293055 A1 | 10/2016 | Hofstetter | |
| 2016/0296144 A1 | 10/2016 | Gaddam et al. | |

FOREIGN PATENT DOCUMENTS

| | | | |
|---|---|---|---|
| CN | 2909427 Y | 6/2007 | |
| CN | 101313842 A | 12/2008 | |
| CN | 201364679 Y | 12/2009 | |
| CN | 201955979 U | 8/2011 | |
| CN | 202443680 U | 9/2012 | |
| CN | 202563792 U | 11/2012 | |
| CN | 202601055 U | 12/2012 | |
| CN | 202694651 U | 1/2013 | |
| CN | 103050040 A | 4/2013 | |
| CN | 203013103 U | 6/2013 | |
| CN | 203038549 U | 7/2013 | |
| CN | 203338651 U | 12/2013 | |
| CN | 203397593 U | 1/2014 | |
| CN | 203562128 U | 4/2014 | |
| CN | 10388679 A | 6/2014 | |
| DE | 9102218 U1 | 5/1991 | |
| DE | 41 05 892 | 8/1992 | |
| DE | 44 14 832 | 11/1995 | |
| DE | 19716341 C2 | 9/2000 | |
| EP | 1 024 173 A1 | 8/2000 | |
| EP | 2 218 570 A1 | 8/2010 | |
| FR | 2 691 826 | 12/1993 | |
| FR | 2 917 876 | 12/2008 | |
| FR | 2 917 876 A1 | 12/2008 | |
| GB | 2488994 A | 9/2012 | |
| JP | 10 211160 | 8/1998 | |
| JP | 2001005378 A | 1/2001 | |
| JP | 2009236963 A | 10/2009 | |
| JP | 3162161 U | 8/2010 | |
| JP | 2013127496 A | 6/2013 | |
| MX | PA 02004422 A | 11/2003 | |
| PT | 106230 | 9/2013 | |
| WO | WO 1994/06109 | 3/1994 | |
| WO | WO 1996/042076 | 2/1996 | |
| WO | WO 1998/58358 | 12/1998 | |
| WO | WO 1999/01074 A1 | 1/1999 | |
| WO | WO 2000/36577 | 6/2000 | |
| WO | WO/2002/38039 A2 | 5/2002 | |
| WO | WO 2002/038039 A3 | 5/2002 | |
| WO | WO 2004/032095 | 4/2004 | |
| WO | WO 2004/082486 A1 | 9/2004 | |
| WO | WO 2005/071639 A1 | 8/2005 | |
| WO | WO 2006/083963 A2 | 8/2006 | |
| WO | WO 2007/068360 | 6/2007 | |
| WO | WO 2008/021720 A2 | 2/2008 | |
| WO | WO 2009/000939 | 12/2008 | |
| WO | WO 2009/089614 A1 | 7/2009 | |
| WO | WO 2010/094730 | 8/2010 | |
| WO | WO 2011/035410 A1 | 3/2011 | |
| WO | WO 2011/046606 A1 | 4/2011 | |
| WO | WO 2011/151304 A1 | 12/2011 | |
| WO | WO 2012/149606 A1 | 11/2012 | |
| WO | WO 2012168287 A1 | 12/2012 | |
| WO | WO 2012175993 | 12/2012 | |
| WO | WO 2013/048978 A1 | 4/2013 | |
| WO | WO 2013/103956 A1 | 7/2013 | |
| WO | WO 2014/022815 A1 | 2/2014 | |
| WO | WO 2014/093669 A1 | 6/2014 | |
| WO | WO 2015/148817 A1 | 10/2015 | |
| WO | WO 2016/183412 A1 | 11/2016 | |
| WO | WO 2016/201085 A1 | 12/2016 | |

OTHER PUBLICATIONS

European Patent Office, The International Search Report and Written Opinion for International Application No. PCT/US2012/60997, dated Mar. 7, 2013, entitled "Simulated Tissue Structure for Surgical Training".

European Patent Office, The International Search Report and Written Opinion for International Application No. PCT/US2012/070971, dated Mar. 18, 2013, entitled "Advanced Surgical Simulation".

Human Patient Simulator, Medical Education Technologies, Inc., http://www.meti.com (1999) all.

The International Bureau of WIPO, International Preliminary Report on Patentability for International Application No. PCT/US2011/053859, titled "Portable Laparoscopic Trainer" dated Apr. 2, 2013.

European Patent Office, The International Search Report and Written Opinion for International Application No. PCT/US2013/062363, dated Jan. 22, 2014, entitled "Surgical Training Model for Laparoscopic Procedures".

European Patent Office, The International Search Report and Written Opinion for International Application No. PCT/US2013/061949, dated Feb. 17, 2014, entitled "Surgical Training Model for Laparoscopic Procedures".

Anonymous: Realsim Systems—LTS2000, Sep. 4, 2005, pp. 1-2, XP055096193, Retrieved from the Internet: URL:https://web.archive.org/web/2005090403;3030/http://www.realsimsystems.com/exersizes.htm (retrieved on Jan. 14, 2014).

European Patent Office, The International Search Report and Written Opinion for International Application No. PCT/US2013/062269, dated Feb. 17, 2014, entitled "Surgical Training Model for Transluminal Procedures".

European Patent Office, The International Search Report and Written Opinion for International Application No. PCT/US2013/061557, dated Feb. 10, 2014, entitled "Surgical Training Model for Laparoscopic Procedures".

European Patent Office, The International Search Report and Written Opinion for International Application No. PCT/US2013/061728 dated Oct. 18, 2013, entitled "Surgical Training Model for Laparoscopic Procedures".

European Patent Office, The International Search Report and Written Opinion for International Application No. PCT/US2012/070971, dated Jul. 4, 2014, entitled "Advanced Surgical Simulation Constructions and Methods".

The International Bureau of WIPO, International Preliminary Report on Patentability for International Application No. PCT/US2012/070971, titled "Advanced Surgical Simulation" dated Jun. 24, 2014.

The International Bureau of WIPO, International Preliminary Report on Patentability for International Application No. PCT/US2012/060997, titled "Simulated Tissue Structure for Surgical Training" dated Apr. 22, 2014.

European Patent Office, The International Search Report and Written Opinion of the International Searching Authority for International Application No. PCT/US2014/038195 titled "Hernia Model", dated Oct. 15, 2014.

European Patent Office, The International Search Report and Written Opinion of the International Searching Authority for International Application No. PCT/US2014/048027 titled "First Entry Model", dated Oct. 17, 2014.

European Patent Office, The International Search Report and Written Opinion for International Application No. PCT/US2014/042998, title; Gallbladder Model, dated Jan. 7, 2015.

The International Bureau of WIPO, International Preliminary Report on Patentability for international application No. PCT/US2013/061728, titled Surgical Training Model for Laparoscopic Procedures, dated Apr. 9, 2015.

The International Bureau of WIPO, International Preliminary Report on Patentability for International Application No. PCT/US2013/062363, titled Surgical Training Model for Laparoscopic Procedures, dated Apr. 9, 2015.

The International Bureau of WIPO, International Preliminary Report on Patentability for International Application No. PCT/US2013/062269, titled Surgical Training Model for Laparoscopic Procedures, dated Apr. 9, 2015.

The International Bureau of WIPO, International Preliminary Report on Patentability for International Application No. PCT/US2013/061557, titled Surgical Training Model for Laparoscopic Procedures, dated Apr. 9, 2015.

(56) References Cited

OTHER PUBLICATIONS

European Patent Office, The International Search Report and Written Opinion for International Application No. PCT/US2015/022774, dated Jun. 11, 2015 entitled "Simulated Dissectible Tissue.".

Kurashima Y et al, "A tool for training and evaluation of Laparoscopic inguinal hernia repair; the Global Operative Assessment of Laparoscopic Skills—Groin Hernia" American Journal of Surgery, Paul Hoeber, New York, NY, US vol. 201, No. 1, Jan. 1, 2011, pp. 54-61 XP027558745.

The International Bureau of WIPO, International Preliminary Report on Patentability, for PCT application No. PCT/US2013/053497, titled, Simulated Stapling and Energy Based Ligation for Surgical Training, dated Feb. 12, 2015.

The International Bureau of WIPO, International Preliminary Report on Patentability for International Application No. PCT/US2013/061949, titled Surgical Training Model for Laparoscopic Procedures, dated Apr. 9, 2015.

The International Bureau of WIPO, International Preliminary Report on Patentability for International Application No. PCT/US2014/019840, titled Simulated Tissue Structure for Surgical Training, dated Sep. 11, 2015.

European Patent Office, The International Search Report and Written Opinion for International Application No. PCT/US2015/020574, titled "Advanced First Entry Model for Surgical Simulation," dated Jun. 1, 2015.

Anonymous: Silicone rubber—from Wikipedia, the free encyclopedia, pp. 1-6, XP055192375, Retrieved from the Internet: URL:http://en.wikipedia.org/w.index.php?title=Silicone_rubber&oldid,=596456058 (retrieved on May 29, 2015).

Lamouche, et al., "Review of tissue simulating phantoms with controllable optical, mechanical and structural properties for use in optical coherence tomography," Biomedical Optics Express, Jun. 1, 2012, 18 pgs., vol. 3, No. 6.

The International Bureau of WIPO, International Preliminary Report on Patentability for International Application No. PCT/US2014/038195, titled Hernia Model, dated Nov. 26, 2015.

European Patent Office, International Search Report and Written Opinion for International Application No. PCT/US2013/053497 titled "Simulated Stapling and Energy Based Ligation for Surgical Training" dated Nov. 5, 2013.

The International Bureau of WIPO, International Preliminary Report on Patentability for International Application No. PCT/US2014/042998, titled "Gallbladder Model" dated Dec. 30, 2015.

The International Bureau of WIPO, International Preliminary Report on Patentability for International Application No. PCT/US2014/048027, titled "First Entry Model" dated Feb. 4, 2016.

The International Bureau of WIPO, International Preliminary Report on Patentability for International Application No. PCT/US2015/020574, entitled "Advanced First Entry Model for Surgical Simulation," dated Sep. 22, 2016, 9 pgs.

European Patent Office, The International Search Report and Written Opinion of the International Searching Authority for International Application No. PCT/US2016/0043277 titled "Appendectomy Model", dated Oct. 4, 2016, 12 pgs.

The International Bureau of WIPO, International Preliminary Report on Patentability for International Application No. PCT/US2015/022774, titled "Simulated Dissectible Tissue," dated Oct. 6, 2016, 9 pgs.

European Patent Office, The International Search Report and Written Opinion of the International Searching Authority for International Application No. PCT/US2016/041852 titled "Simulated Dissectible Tissue", dated Oct. 13, 2016, 12 pgs.

Society of Laparoendoscopic Surgeons, "Future Technology Session: The Edge of Innovation in Surgery, Space, and Business" http://www.laparoscopytoday.com/endourology/page/2/ , Figure 1B: http://laparoscopy.blogs.com/laparoscopy_today/images/6-1/6-1VlaovicPicB.jpg , Sep. 5-8, 2007, 10 pgs.

Miyazaki Enterprises, "Miya Model Pelvic Surgery Training Model and Video," www.miyazakienterprises, printed Jul. 1, 2016, 1 pg.

European Patent Office, International Search Report and Written Opinion for International Application No. PCT/US2015/059668 titled "Simulated Tissue Models and Methods" dated Apr. 26, 2016, 20 pgs.

Australian Patent Office, Patent Examination Report No. 1 for Australian Application No. 2012358851 titled "Advanced Surgical Simulation" dated May 26, 2016, 3 pgs.

European Patent Office, International Search Report and Written Opinion for International Application No. PCT/US2016/032292 titled "Synthetic Tissue Structures for Electrosurgical Training and Simulation," dated Jul. 14, 2016, 11 pgs.

European Patent Office, International Search Report and Written Opinion for International Application No. PCT/US2016/018697 titled "Simulated Tissue Structures and Methods," dated Jul. 14, 2016, 21 pgs.

European Patent Office, International Search Report and Written Opinion for International Application No. PCT/US2016/034591 titled "Surgical Training Model for Laparoscopic Procedures," dated Aug. 8, 2016, 18 pgs.

European Patent Office, The International Search Report and Written Opinion of the International Searching Authority for International Application No. PCT/US2016/036664 titled "Hysterectomy Model", dated Aug. 19, 2016, 15 pgs.

3D-MED Corporation, "Validated Training Course for Laparoscopic Skills", https://www.3-dmed.com/sites/default/files/product-additional/product-spec/Validated%20Training%20Course%20for%20Laparoscopic%20Skills.docx_3.pdf, printed Aug. 23, 2016, pp. 1-6.

3D-MED Corporation, "Loops and Wire #1" https://www.3-dmed.com/product/loops-and-wire-1 , printed Aug. 23, 2016, 4 pgs.

Barrier, et al., "A Novel and Inexpensive Vaginal Hysterectomy Simulatory, " Simulation in Healthcare: The Journal of the Society for Simulation in Healthcare, vol. 7, No. 6, Dec. 1, 2012, pp. 374-379.

European Patent Office, Examination Report for European Application No. 14733949.3 titled "Gallbladder Model," dated Dec. 21, 2016, 6 pgs.

European Patent Office, The International Search Report and Written Opinion of the International Searching Authority for International Application No. PCT/US2016/062669 titled "Simulated Dissectible Tissue," dated Apr. 5, 2017, 19 pgs.

European Patent Office, The International Search Report and Written Opinion of the International Searching Authority for International Application No. PCT/US2017/020389 titled "Simulated Tissue Cartridge", dated May 24, 2017, 13 pgs.

The International Bureau of WIPO, International Preliminary Report on Patentability and Written Opinion for International Application No. PCT/US2015/059668, entitled "Simulated Tissue Models and Methods," dated May 26, 2017, 16 pgs.

European Patent Office, Invitation to Pay Additional Fees for International Application No. PCT/US2016/062669, titled "Simulated Dissectible Tissue", dated Feb. 10, 2017, 8 pgs.

European Patent Office, The International Search Report and Written Opinion of the International Searching Authority for International Application No. PCT/US2016/055148 titled "Hysterectomy Model", dated Feb. 28, 2017, 12 pgs.

The International Bureau of WIPO, International Preliminary Report on Patentability for International Application No. PCT/US2016/041852, entitled "Simulated Dissectible Tissue," dated Jan. 25, 2018, 12 pgs.

European Patent Office, Extended European Search Report for European Patent Application No. EP 17202365.7, titled "Gallbladder Model", dated Jan. 31, 2018, 8 pgs.

The International Bureau of WIPO, International Preliminary Report on Patentability for International Application No. PCT/US2016/043277, entitled "Appendectomy Model," dated Feb. 1, 2018, 9 pgs.

The International Bureau of WIPO, International Preliminary Report on Patentability for International Application No. PCT/US2016/055148, entitled "Hysterectomy Model," dated Apr. 12, 2018, 12 pgs.

The International Bureau of WIPO, International Preliminary Report on Patentability for International Application No. PCT/US2016/

(56) References Cited

OTHER PUBLICATIONS 0032292, entitled "Synthetic Tissue Structures for Electrosurgical Training and Simulation," dated Nov. 23, 2017, 2017, 8 pgs.

The International Bureau of WIPO, International Preliminary Report on Patentability for International Application No. PCT/US2016/034591, entitled "Surgical Training Model for Laparoscopic Procedures," dated Dec. 7, 2017, 2017, 14 pgs.

The International Bureau of WIPO, International Preliminary Report on Patentability for International Application No. PCT/US2016/036664, entitled "Hysterectomy Model," dated Dec. 21, 2017, 10 pgs.

The International Bureau of WIPO, International Preliminary Report on Patentability for International Application No. PCT/US2016/018697, entitled "Simulated Tissue Structures and Methods," dated Aug. 31, 2017, 14 pgs.

European Patent Office, The International Search Report and Written Opinion for International Application No. PCT/US2018/018895, entitled "Synthetic Tissue Structures for Electrosurgical Training and Simulation," dated May 17, 2018, 12 pgs.

The International Bureau of WIPO, International Preliminary Report on Patentability for International Application No. PCT/US2016/062669, entitled "Simulated Dissectible Tissue," dated May 31, 2018, 11 pgs.

European Patent Office, The International Search Report and Written Opinion for International Application No. PCT/US2018/018036, entitled "Laparoscopic Training System," dated Jun. 8, 2018, 13 pgs.

European Patent Office, The International Search Report and Written Opinion for International Application No. PCT/US2017/039113, entitled "Simulated Abdominal Wall," dated Aug. 7, 2017, 13 pgs.

Simulab, Hernia Model, http://www.simulab.com/product/surgery/open/hernia-model.

McGill Laparoscopic Inguinal Hernia Simulator, Novel Low-Cost Simulator for Laparoscopic Inguinal Hernia Repair.

University of Wisconsin-Madison Biomedical Engineering, Inguinal Hernia Model, http://bmedesign.engr.wisc.edu/projects/s10/hernia_model/.

* cited by examiner

SURGICAL TRAINING MODEL FOR TRANSLUMINAL LAPAROSCOPIC PROCEDURES

CROSS-REFERENCE TO RELATED APPLICATIONS

This application claims priority to and benefit of U.S. Provisional Patent Application Ser. No. 61/707,581 entitled "Surgical training model for transluminal laparoscopic procedures" filed on Sep. 28, 2012 which is incorporated herein by reference in its entirety.

FIELD OF THE INVENTION

This application is generally related to surgical training tools, and in particular, to simulated tissue structures and models for teaching and practicing various surgical techniques and procedures related but not limited to laparoscopic, endoscopic and minimally invasive surgery.

BACKGROUND OF THE INVENTION

Medical students as well as experienced doctors learning new surgical techniques must undergo extensive training before they are qualified to perform surgery on human patients. The training must teach proper techniques employing various medical devices for cutting, penetrating, clamping, grasping, stapling, cauterizing and suturing a variety of tissue types. The range of possibilities that a trainee may encounter is great. For example, different organs and patient anatomies and diseases are presented. The thickness and consistency of the various tissue layers will also vary from one part of the body to the next and from one patient to another. Different procedures demand different skills. Furthermore, the trainee must practice techniques in various anatomical environs that are influenced by factors such as the size and condition of the patient, the adjacent anatomical landscape and the types of targeted tissues and whether they are readily accessible or relatively inaccessible.

Numerous teaching aids, trainers, simulators and model organs are available for one or more aspects of surgical training. However, there is a need for model organs or simulated tissue elements that are likely to be encountered in and that can be used for practicing endoscopic and laparoscopic, minimally invasive surgical procedures. In laparoscopic surgery, a trocar or cannula is inserted to access a body cavity and to create a channel for the insertion of a camera such as a laparoscope. The camera provides a live video feed capturing images that are then displayed to the surgeon on one or more monitors. Another trocar/cannula is inserted to create a pathway through which surgical instruments are passed for performing procedures observed on the monitor. The targeted tissue location such as the abdomen is typically enlarged by delivering carbon dioxide gas to insufflate the body cavity and create a working space large enough to accommodate the scope and instruments used by the surgeon. The insufflation pressure in the tissue cavity is maintained by using specialized trocars. Laparoscopic surgery offers a number of advantages when compared with an open procedure. These advantages include reduced pain, reduced blood and shorter recovery times.

Laparoscopic or endoscopic minimally invasive surgery requires an increased level of skill compared to open surgery because the target tissue is not directly observed by the clinician. The target tissue is observed on monitors displaying a portion of the surgical site that is accessed through a small opening. Therefore, clinicians need to practice visually determining tissue planes, three-dimensional depth perception on a two-dimensional viewing screen, hand-to-hand transfer of instruments, suturing, precision cutting and tissue and instrument manipulation. Typically, models simulating a particular anatomy or procedure are placed in a simulated pelvic trainer where the anatomical model is obscured from direct visualization by the practitioner. Ports in the trainer are employed for passing instruments to practice techniques on the anatomical model hidden from direct visualization. Simulated pelvic trainers provide a functional, inexpensive and practical means to train surgeons and residents the basic skills and typical techniques used in endoscopic and laparoscopic minimally invasive surgery such as grasping, manipulating, cutting, tying knots, suturing, stapling, cauterizing as well as how to perform specific surgical procedures that utilized these basic skills. Simulated pelvic trainers are also effective sales tools for demonstrating medical devices required to perform these laparoscopic procedures.

Some procedures are required to be performed within small confines, such as a rectum, and substantially along an axis such as in transanal endoscopic micro-surgery (TEMS) also known as transanal minimally invasive surgery (TAMIS) or other transluminal surgeries generally performed to resect benign and malignant lesions in the distal to proximal rectum using transanal access platforms and standard laparoscopic instrumentation. These procedures require the clinician to develop skills such as three-dimensional depth perception along the lumen, determining tissue planes and hand-to-hand transfer, in addition to suturing, cauterizing, stapling, tying knots, cutting, grasping, manipulating instruments and moving tissue all performed within the small confines of elongate tubular region while observing such procedures on a two-dimensional video monitor. Therefore, it is desirable to present a model suitable for practicing these skills and that also isolates a particular step of a procedure for the trainee such as the passing of sutures for the clinician to practice in a simulated laparoscopic environment. The laparoscopic training model is removably placed inside a simulated laparoscopic environment such as a laparoscopic trainer in which it is at least partially obscured from direct visualization. A camera and monitor provide visualization to the practitioner. After a technique is practiced, it is furthermore desirable that such a model permits repeatable practice with ease, speed and cost savings. In view of the above, it is an object of this invention to provide a surgical training device that realistically simulates an anatomy and isolates a particular stage or step of a procedure that also enables repeatable practice. It has been demonstrated that the use of simulation trainers greatly enhances the skill levels of new laparoscopists and are a great tool to train future surgeons in a non-surgical setting. There is a need for such improved, realistic and effective surgical training models.

SUMMARY OF THE INVENTION

According to one aspect of the invention, a surgical training device is provided. The device includes a top cover connected to and spaced apart from the base to define an internal cavity between the top cover and the base. At least one aperture, side opening, or a penetrable tissue simulation region is provided for accessing the internal cavity. A camera is disposed inside the cavity and configured to display video images on a video monitor connected to the camera. The video monitor is located outside of the cavity. A model is removably disposed inside the cavity such that the model is substantially obscured from view yet observable via the camera displaying images of the model on the video monitor. The model includes a body having an outer surface and an inner surface. The inner surface defines an elongate lumen having an open proximal end. A plurality of eyelets is connected to the inner surface of the lumen and distributed along the longitudinal axis. The plurality of eyelets forms at least one pathway for practicing the passing of at least one needle and suture through the eyelets of the pathway.

According to another aspect of the invention, a surgical training device is provided. The device includes an elongate body having an inner surface and an outer surface. The inner surface defines a lumen with a proximal opening and a longitudinal axis. A plurality of eyelets is connected to the inner surface of the lumen. The eyelets extend inwardly from the inner surface into the lumen and are spaced apart circumferentially and longitudinally along the lumen. Each eyelet has a head portion with an aperture sized for passing a suture needle and suture. The aperture of each eyelet defines an aperture plane.

According to another aspect of the invention, a surgical training device for the practice of laparoscopic suture passing along an enclosed lumen is provided. A practice model is disposed inside a cavity of a laparoscopic trainer. The model includes a body with an elongate sidewall having an inner surface defining an internal lumen with an open proximal end. A plurality of eyelets is connected to the inner surface of the lumen. The eyelets extend into the lumen from the inner surface. Each eyelet includes a head portion connected to a neck portion. The neck portion is connected to the inner surface. The head portion has an aperture defining an aperture plane. The open proximal end is configured for inserting a suture and suture needle into the lumen and through one or more apertures of the plurality of eyelets that are spaced longitudinally and circumferentially along the lumen.

According to another aspect of the invention, a surgical training device is provided. The device includes a body having an outer surface and an inner surface. The inner surface defines an elongate lumen having an open proximal end. A plurality of eyelets is connected to and distributed longitudinally along the inner surface of the lumen. At least one of the eyelets includes a hook-like feature. A staging area at one end of the lumen is provided. The staging area has at least one object removably located in the staging area. The at least one object includes an aperture sized to fit over the hook-like feature of at least one of the eyelets. The at least one object is configured to be removable from the staging area and movable along a length inside the lumen and onto the hook-like feature.

DETAILED DESCRIPTION OF THE INVENTION

Figure 1:
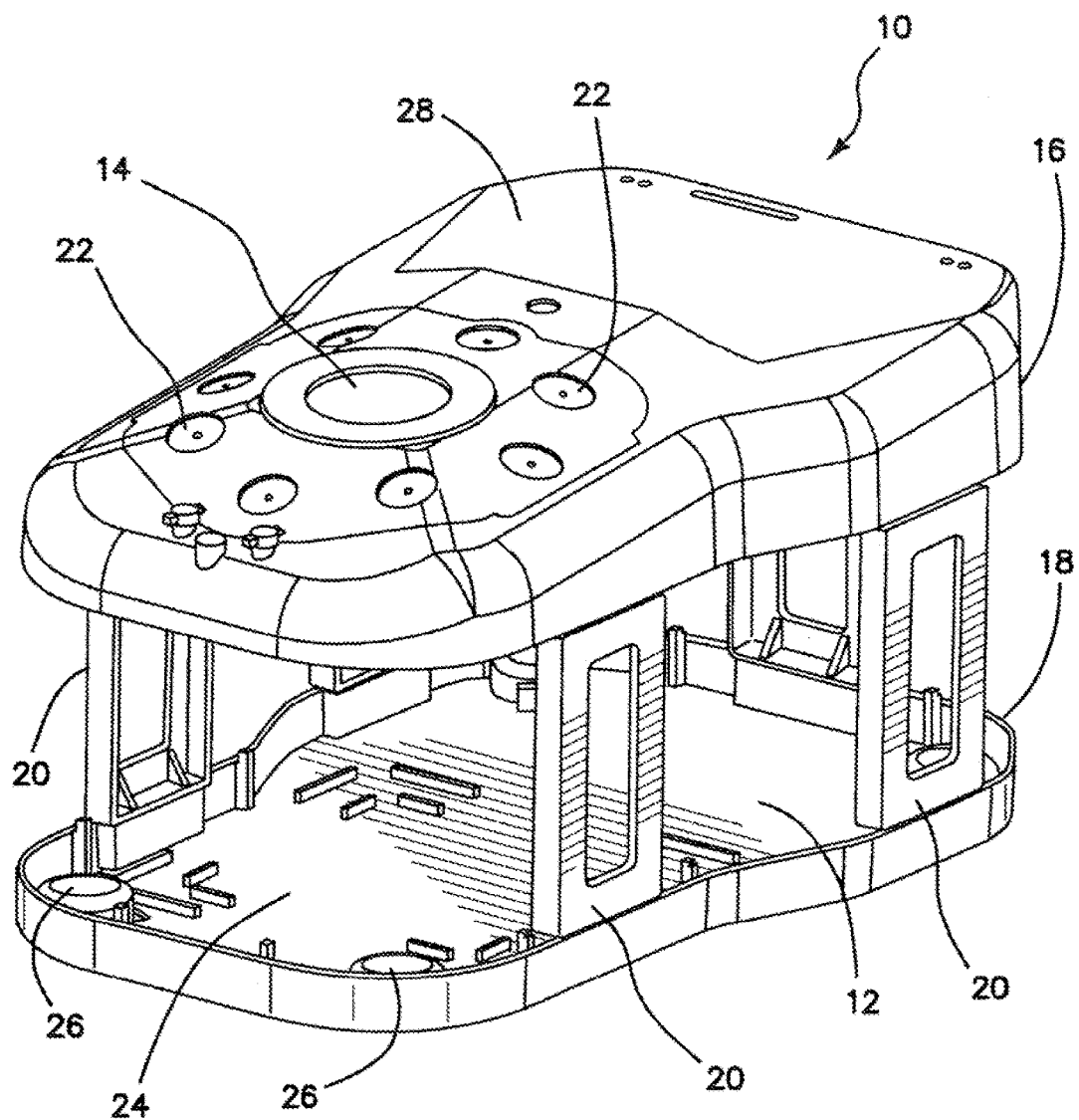
FIG. 1 illustrates a top perspective view of a surgical training device according to the present invention.

A surgical training device 10 that is configured to mimic the torso of a patient such as the abdominal region is shown in FIG. 1. The surgical training device 10 provides a body cavity 12 substantially obscured from the user for receiving simulated or live tissue or model organs or training model of the like described in this invention. The body cavity 12 is accessed via a tissue simulation region 14 that is penetrated by the user employing devices to practice surgical techniques on the tissue or organ model found located in the body cavity 12. Although the body cavity 12 is shown to be accessible through a tissue simulation region, a hand-assisted access device or single-site port device may be alternatively employed to access the body cavity 12. An exemplary surgical training device is described in U.S. patent application Ser. No. 13/248,449 entitled "Portable Laparoscopic Trainer" filed on Sep. 29, 2011 and incorporated herein by reference in its entirety. The surgical training device 10 is particularly well suited for practicing laparoscopic or other minimally invasive surgical procedures.

Still referencing FIG. 1, the surgical training device 10 includes a top cover 16 connected to and spaced apart from a base 18 by at least one leg 20. FIG. 1 shows a plurality of legs 20. The surgical training device 10 is configured to mimic the torso of a patient such as the abdominal region. The top cover 16 is representative of the anterior surface of the patient and the space between the top cover 16 and the base 18 is representative of an interior of the patient or body cavity where organs reside. The surgical trainer 10 is a useful tool for teaching, practicing and demonstrating various surgical procedures and their related instruments in simulation of a patient undergoing a surgical procedure. Surgical instruments are inserted into the cavity 12 through the tissue simulation region 14 as well as through pre-established apertures 22 in the top cover 16. Various tools and techniques may be used to penetrate the top cover 16 to perform mock procedures on model organs or training tools placed between the top cover 16 and the base 18. The base 18 includes a model-receiving area 24 or tray for staging or holding a simulated tissue model. The model-receiving area 24 of the base 18 includes frame-like elements for holding the model (not shown) in place. To help retain the simulated tissue model on the base 18, a clip attached to a retractable wire is provided at locations 26. The retractable wire is extended and then clipped to hold the tissue model in position substantially beneath the tissue simulation region 14. Other means for retaining the tissue model include a patch of hook-and-loop type fastening material (VELCRO®) affixed to the base 18 in the model receiving area 24 such that it is removably connectable to a complementary piece of hook-and-loop type fastening material (VELCRO®) affixed to the model.

A video display monitor 28 that is hinged to the top cover 16 is shown in a closed orientation in FIG. 1. The video monitor 62 is connectable to a variety of visual systems for delivering an image to the monitor. For example, a laparoscope inserted through one of the pre-established apertures 22 or a webcam located in the cavity and used to observe the simulated procedure can be connected to the video monitor 28 and/or a mobile computing device to provide an image to the user. Also, audio recording or delivery means may also be provided and integrated with the trainer 10 to provide audio and visual capabilities. Means for connecting a portable memory storage device such as a flash drive, smart phone, digital audio or video player, or other digital mobile device is also provided, to record training procedures and/or play back pre-recorded videos on the monitor for demonstration purposes. Of course, connection means for providing an audio visual output to a larger screen other than the monitor is provided. In another variation, the top cover 10 does not include a video display but includes means for connecting with a laptop computer, a mobile digital device or tablet such as an IPAD® and connecting it by wire or wirelessly to the trainer.

When assembled, the top cover 16 is positioned directly above the base 18 with the legs 20 located substantially around the periphery and interconnected between the top cover 16 and base 18. The top cover 16 and base 18 are substantially the same shape and size and have substantially the same peripheral outline. The internal cavity is partially or entirely obscured from view. In the variation shown in FIG. 1, the legs include openings to allow ambient light to illuminate the internal cavity as much as possible and also to advantageously provide as much weight reduction as possible for convenient portability. The top cover 16 is removable from the legs 20 which in turn are removable or collapsible via hinges or the like with respect to the base 18. Therefore, the unassembled trainer 10 has a reduced height that makes for easier portability. In essence, the surgical trainer 10 provides a simulated body cavity 12 that is obscured from the user. The body cavity 12 is configured to receive at least one surgical model accessible via at least one tissue simulation region 14 and/or apertures 22 in the top cover 16 through which the user may access the models to practice laparoscopic or endoscopic minimally invasive surgical techniques. The model may also be accessed through the side openings of the trainer.

Figure 2:
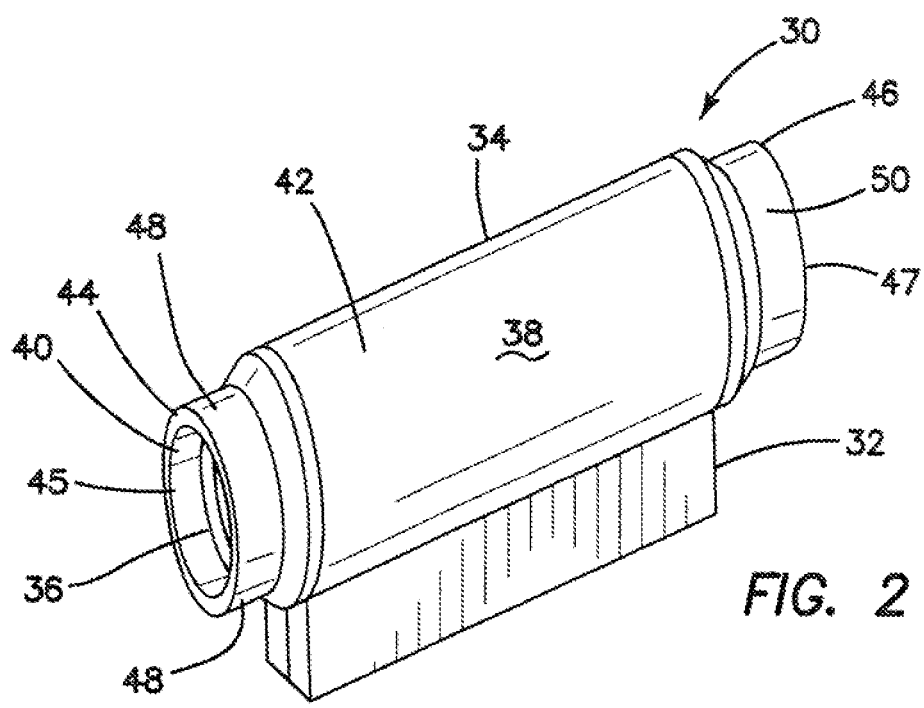
FIG. 2 illustrates a top perspective view of a model according to the present invention.

A model 30 for the practice of passing sutures in laparoscopic, endoscopic or other minimally invasive procedures according to the present invention is shown in FIG. 2. The model 30 is configured to be placed inside the body cavity 12 of the surgical training device 10 described above or other similar surgical trainer. The model 30 includes a base 32 connected to a body 34.

The base 32 of the model 30 is a platform that serves as a bottom support for the rest of the model 30 and it is sized and configured such that the model 30 does not tip over. The platform is made of any material such as metal or plastic. The base 32 is of sufficient heft to maintain the stability of the model 30 in the upright position while being manipulated by a user. The model 30 is sized and configured to be placed into the body cavity 12 of the surgical trainer 10 in the location of the model receiving area 24. The underside of the base 32 is provided with means to affix the model 30 inside the surgical trainer 10. Such means to affix the model 30 inside the trainer 10 include but are not limited to adhesive, suction cup, magnet, snap-fit, and a hook-and-loop type fastener material attached to the bottom surface of the base 32 and configured to connect with a complementary hook-and-loop type fastener material or adhesive attached to the base 18 of the surgical trainer 30. Alternatively, the model 30 may be used as a stand alone trainer without and outside of the trainer 10.

Figure 3:
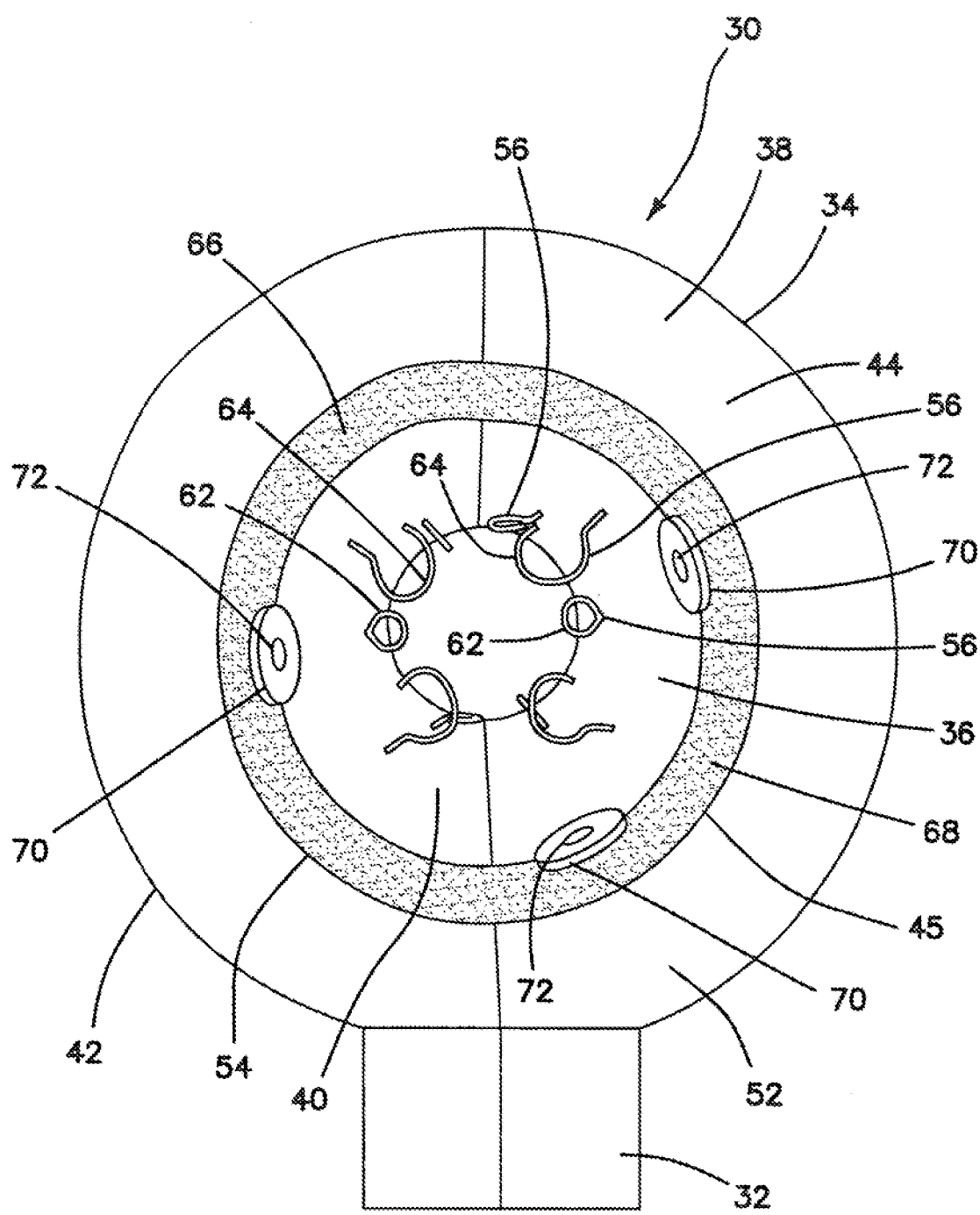
FIG. 3 illustrates a proximal end view of a model according to the present invention.
Figure 4:
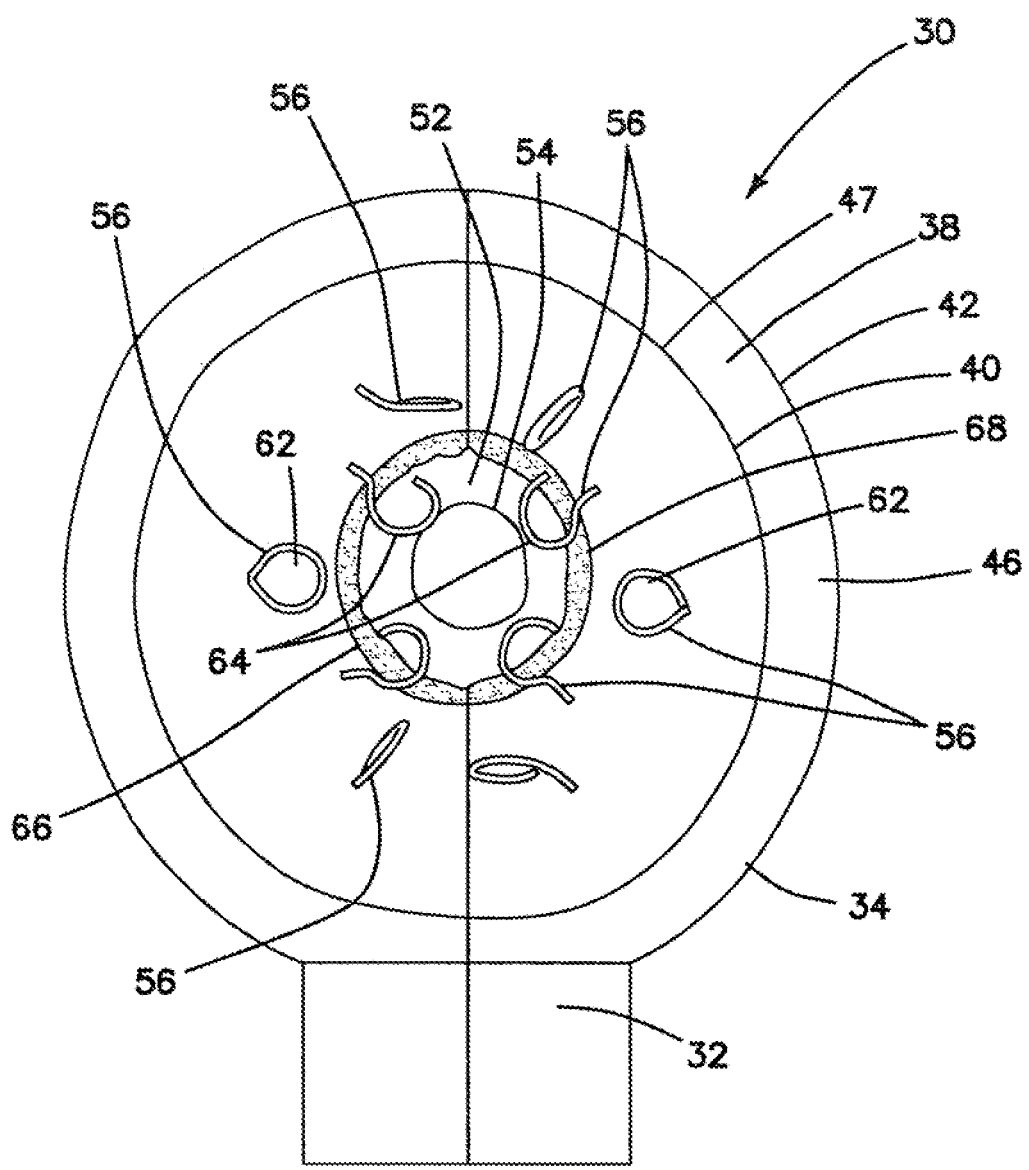
FIG. 4 illustrates a distal end view of a model according to the present invention.

Referencing FIGS. 2-4, the body 34 of the model 30 is connected to the base 32 or integrally formed with the base 32 such that the body 34 is supported with the base 32 in contact with a supporting surface such as a table top and may be configured to have an adjustable angle with respect to the table top or base 32. The body 34 is substantially cylindrical in shape defining an inner lumen 36. In one variation, the inner lumen 36 has a diameter of approximately 3-4 inches. The body 34 includes a sidewall 38 having an inner surface 40 and an outer surface 42 defining a thickness therebetween and extending along a longitudinal axis between a proximal end 44 having a proximal opening 45 and a distal end 46 having a distal opening 47. The tubular body 34 is made of rigid plastic material that may be translucent or transparent permitting light to enter into the lumen through the wall 38 to illuminate the interior lumen 36. The tubular body 34 may also be a flexible shell and opaque as well as translucent. The body 34 has a cylindrical lumen 36 with a circular cross-section, however, the invention is not so limited and the lumen may be any cross-sectional shape. The body 34 may consist of two halves which may snap together or be hinged together such that the inner lumen 36 is easily accessible. The body 34 may include structures and shapes or additional base elements that allow the body 34 to be placed upright or supported at any angle. The body 34 defines a reduced cross-sectional area at a proximal end portion 48 and at a distal end portion 50. These end portions 48, 50 are configured to allow the addition of various end caps and closures, such as the GELPOINT® by Applied Medical Resources Corporation in California, and to provide a smaller entryway into the lumen 36. In one variation, the body 34 includes a removable sphincter insert 52 to simulate an anus which is attached to the proximal end portion 48. The sphincter insert 52 is typically made of silicone to provide a realistic soft and flexible tissue-like interface or entryway to the lumen 36. The sphincter insert 52 is insertable into the proximal opening 45 and includes an aperture 54 generally coaxial with the lumen 36 of the body 34. An access device (not shown) may also be provided and connected to the body 34 at the proximal end 44 by being inserted into the sphincter insert 52 if is one is used or directly into the proximal opening 45 of the body 34. The access device seals the proximal opening of the lumen 36 and provides a simulated insufflation port. Hand-access devices, single-port devices and retraction devices all of which can be used with the model 30 are disclosed in greater detail in U.S. Pat. Nos. 7,473,221, 6,958,037, 7,650,887, U.S. Published Patent Application No. 2009-0187079, and U.S. Published Patent Application No. 2010-0094227, the disclosures of which are incorporated herein by reference in their entireties. Also, other simulated tissue structures made of silicone may be placed at the proximal end 44 or distal end 46 covering at least partially or circumferentially the proximal opening 45 or distal opening 47 or along the inner lumen 36 such that the simulated tissue structures in the form of membranes, for example, would have to be retracted in order to access other parts of the inner lumen 36.

Figure 5A:
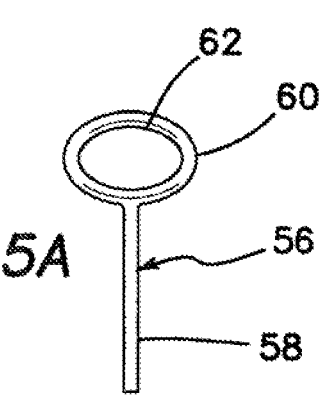
FIGS. 5A-5D illustrate various eyelets according to the present invention.
Figure 5B:
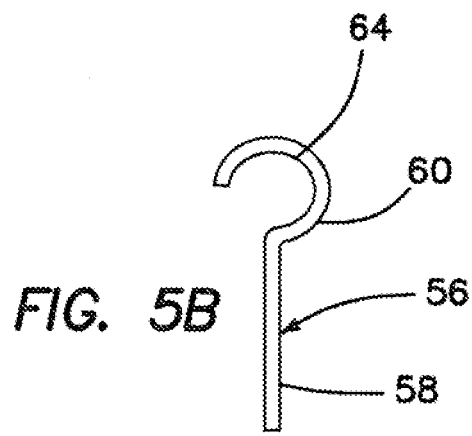

The model 30 includes a plurality of eyelets 56 connected to and spaced around and along the inner surface 40 of the body 34 such that the eyelets 56 are configured to reside above the inner surface 40 of the body 34 as shown in FIGS. 3 and 4. An exemplary eyelet 56 is shown in FIG. 5A. In general, the eyelet 56 is configured to provide an opening through which a clinician can practice passing a needle and suture. The eyelet 56 includes a neck portion 58 connected to a head portion 60. The head portion 60 includes at least one aperture 62 defining an aperture plane in which it lies. Although the aperture 62 is shown to have an elliptical shape, the invention is not so limited and the aperture 62 can have any shape such as a circle, polygon or closed curve. While FIG. 5A depicts a closed aperture 62, an open hook-like aperture 64 is within the scope of the present invention as shown in FIG. 5B. An open aperture 64 is an aperture that is open and only partially enclosed by surrounding material of the head portion 60 leaving an opening or entry into the aperture 60 that is anywhere from approximately ⅛ to ¼ of the aperture perimeter in size forming a hook-like configuration. In one variation, the aperture 62 of the eyelet 56 is covered with at least one layer of silicone or other material that may include a mesh or fabric reinforcement such that passing a needle and suture through the aperture 62 requires piercing the covering of the aperture 62 with the needle and suture. The covering mimics real tissue and thus contributes to the realism of the exercise.

Figure 5C:
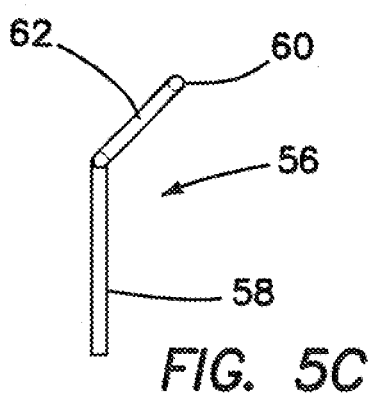
Figure 5D:
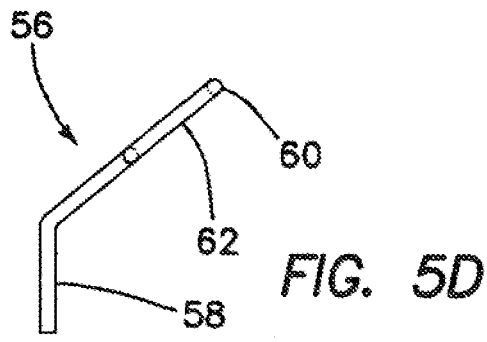

In one variation, the eyelet 56 is rigid. In another variation, the neck portion 58 of the eyelet 56 is flexible while the head portion 60 is rigid and in another variation both the neck portion 58 and head portion 60 are flexible or capable of being deflected. A deflectable or flexible eyelet 56 increases the difficult of performing suture passing. In another variation, the eyelet 56 is pre-bent or angled with respect to the neck portion 58 as shown in FIGS. 5C and 5D. In general, the eyelet 56 provides an aperture 62 for the surgeon to practice passing a surgical needle and suture through. The neck 58 of the eyelet 56 is configured to space the aperture 62 from the inner surface 40 of the body 34. Also, the neck 58 is configured to connect to the body 34 and as such, the neck 58 may include threads, adhesive or other means for connection to the body. Also, the eyelet 56 may be mounted to the body 34 such that the entire eyelet 56 rotates or is rotatable with respect to the body 34 and, in another variation, the eyelet 56 is configured such that the head 60 of the eyelet 56 rotates with respect to the neck portion 58. Such resulting rotatability of the aperture 62, 64 with respect to the body 34 increases the difficulty of passing sutures. In one variation, the inner surface 40 of the body 34 is pliable or includes a pliable coating to represent tissue into which the eyelets 56 are implanted. A pliable inner surface 40 results in the eyelets 56 moving as real tissue when the eyelets 56 are manipulated by the user.

A plurality of eyelets 56 is connected to the inner surface 40 of the body 34. Each eyelet 56 may be the same or the plurality of eyelets 56 may include a mixture of eyelets 56 having different features described above such as eyelets with apertures 62, 64 of different sizes and shapes, flexible eyelets, rotatable eyelets, deflectable eyelets, plastically deformable eyelets which when deflected remain deflected and deflectable eyelets that resume their previous position after being deflected. As can be seen in FIGS. 3 and 4, some eyelets 56 are connected to the body 34 such that only the head portion 60 is above the inner surface 40 whereas other eyelets 56 are raised such that both the head portion 60 and neck portion 58 are above the inner surface 40. The plurality of eyelets 56 may include eyelets of different colors including colors that blend in against the background or color of the inner surface 40 of the body 34 for increased difficulty in visualizing the eyelet aperture 62, 64 on a camera viewing monitor. Also, at least one of the eyelets 56 attached to the body 34 may also be colored such that the eyelet 56 visually stands out or is in contrast when viewed against the background or inner surface 40 of the body with a scope. Furthermore, the plurality of eyelets 56 may include one or more groups of eyelets that have the same color, thus being color-coded so that a predetermined path along which a suture must be passed is defined by the color of the eyelets 56. For example, a set of green colored eyelets 56 may define either a predetermined path that is particular to a surgical procedure or may define a relatively easy skill level define by eyelets 56 with relatively large apertures 62, 64 for example. Alternatively, the predetermined path may be marked not with the coloring of the eyelets 56 but with interconnecting lines or other markings on the inner surface 40 of the body 34. Such markings on the inner surface 40 can include anatomical landmarks from which the user can deduct the correct pathway to follow for passing sutures. Alternatively, the markings are lines drawn with ink on the inner surface 40 interconnecting the eyelets 56. The line markings are contrast colored against the body 34 and may be color coded to indicate a predetermined pathway. Also, among the plurality of eyelets 56 attached to the body 34, groups of eyelets 56 may be interconnected with markings such as lines drawn on the body 34 that connect the eyelets 56 within a certain group. The certain group of eyelets can define a predetermined pathway to follow for testing the skill of the user making sure that all eyelets 56 of a particular group lying along a particular pathway have been passed. Hence, the arrangement and choice of eyelets 56 in a subset of eyelets 56 among a plurality attached to the body, can be used to improve the skill of passing a needle and suture through an aperture and as such the pathways and eyelets selected in each pathway can vary in difficulty from relatively easy eyelets, for example, ones having large apertures, standing upright and being rigid and located in relatively flat areas of the outer surface and being starkly contrasted against the background to more difficult eyelets, for example ones comprising smaller apertures, flexible eyelets, deflectable eyelets and eyelets colored so as to blend in with the background.

A predetermined pathway for passing sutures may be predefined based on the surgical procedure to be practiced. For example, the practice of particular procedure may require a generally circular pathway with eyelets having small apertures. Accordingly, such a pathway may be defined and marked by colored eyelets or markings on the inner surface 40 for the surgeon to practice. Hence, the surgical procedure to be practiced may determine the types of eyelets used and their arrangement and the markings indicating the particular pathway to the user.

The eyelets 56 are embedded within the body 34 and extend inwardly into the lumen 36 in a variety of patterns and configurations creating patterns and pathways. Some pathways may be aimed at making sure the clinician visualizes all the eyelets and successfully passes through all within a set without missing ones that are difficult to visualize or to pass a suture through. Of course, the eyelets are placed at differing heights and angles with the objective being for the surgeon to pass an actual suture needle or simulated suture needle through each eyelet and in a specific order to complete each pathway. The aperture planes are angled with respect to at least one other aperture plane of the plurality of eyelets. There are multiple pathways with different sized eyelets for different skill levels which allows for skill advancement within the same platform.

The model 30 may include interchangeable eyelets 56 in which the user accesses the inner lumen 36 by opening the body 34 made of two parts hinged or otherwise connected together. The user may personally select certain eyelets or a predetermined set of eyelets that correspond to a pathway of a surgical procedure for practicing certain skills, difficulty levels or procedures before closing the body of the model to reform the lumen. The lumen may include obstructions or tumors projecting into the lumen that increase the difficulty in navigating the lumen. In one variation, the central lumen 36 is provided with a core extending axially along the longitudinal axis of the model 30. The core may be made of a polymer that may be rigid or soft and pliable such as silicone. The core obstructs the lumen reducing the accessible area to an annular space that extends longitudinally along the model 30 increasing the difficulty level of performing exercises. The model 30 is advantageously challenging and adjustable for all skill levels and effective in that the user must use both hands equally to complete the path. The suture needle must also be manipulated to be facing the proper direction for each pass in order to successfully pass it through the aperture. Hence, the model is particularly useful for the practice of laparoscopic suture passing, determining and visualizing tissue planes, the practice of depth perception and visualization of eyelets, hand-to-hand transfer of instruments and needles, suturing and tissue manipulation all within the confines a small tubular structure. This model allows the clinician to keep their skills sharp or to "warm-up" beforehand for successful outcomes in real surgery.

The body 34 further includes a staging area 66 located inside the lumen 36 and circumferentially attached to the inner surface 40 as can be seen in FIG. 3. The staging area 66 includes a location for holding objects 70. The staging area 66 may consist of a pocket or compartment. In one variation, it comprises a strip of hook-and-loop-type fastener such as VELCRO®. In this variation, the objects 70 comprise at least a portion of hook-and-loop-type fastener such as VELCRO® that is complimentary to the hook-and-loop-type fastener of the strip in the staging area 66 such that the object 70 is removably attachable to the staging area 66. Other means for removably attaching the at least one object 70 includes adhesive on the object 70 or in the staging area 66. FIG. 3 illustrates a strip of hook-and-loop type fastener located circumferentially around the inner surface 40 of the lumen 36 with objects 70 having hook-and-loop-type fastener surfaces that are attached to the strip at a proximal end 44 of the body 34. The objects 70 are flat or disc-like having a surface area with hook-and-loop type fastener configured for attachment to the complimentary hook-and-loop-type fastener location on the inner surface. The objects 70 can be of any shape and are circular in one variation. The objects 70 include apertures 72. The objects 70 are temporarily placed in or otherwise removably fixed to the staging area 66. The user practices laparoscopic techniques such as hand-to-hand transfer and depth perception by removing at least one object 70 and transporting it longitudinally along the tubular lumen 36 to one of the eyelets 56 having an open aperture 64 that forms a hook-like feature. The user practices placing or hanging the object 70 onto the hook-like feature of the eyelet 56 which involves moving the eyelet 56 through the aperture 72 on the object 70. The user can continue practice by removing the object 70 from the hook-like eyelet, moving it longitudinally back along the lumen 36 to the staging area 66 and placing or attaching the at least one object 70 to the staging area 66. Proper orientation of an object 70 is required to hook the aperture 72 onto a hook-like eyelet 56 in order to complete the training exercise. The exercise is effective in that it requires the user to use hand-to-hand transfer techniques and depth perception in a laparoscopic environment.

The practice model 30 is placed inside a laparoscopic trainer 10 and a laparoscope is inserted into the cavity 12 to observe the model 30. A suture needle and suture are passed through one of the apertures 22 or tissue simulation region 14 or side openings between the top cover 16 and the base 18 into the cavity 12 and the procedure of passing the suture through the eyelets 56 is observed on the video display monitor 28 providing a two-dimensional video representation to the practitioner of the three-dimensional model 30 inside the laparoscopic trainer 10 and obscured from direct visualization. The model 30 and trainer 10 combination advantageously allow the user to practice identifying a desired surgical pathway for the suture, moving the needle and passing the suture through a number of eyelets 34 laparoscopically.

While certain embodiments have been particularly shown and described with reference to exemplary embodiments thereof, it will be understood by those of ordinary skill in the art that various changes in form and details may be made therein without departing from the spirit and scope thereof as defined by the following claims.

We claim:

1. A surgical training device, comprising:
    a body having an outer surface and an inner surface defining an elongate lumen having an open proximal end;
    a plurality of eyelets connected to the inner surface of the lumen and distributed along the longitudinal axis; and
    an elongate core disposed coaxially inside the lumen and extending longitudinally along the longitudinal axis of the model;
    wherein the core obstructs the lumen reducing the accessible area to an annular space that extends longitudinally along the model;
    wherein said plurality of eyelets forms at least one pathway for practicing the passing of at least one needle and suture through the eyelets of said at least one pathway.

2. The surgical training device of claim 1 wherein the eyelets extend varying distances into the lumen from the inner surface.

3. The surgical training device of claim 1 wherein each eyelet includes an aperture defining an aperture plane; and at least one aperture plane is angled with respect to another aperture plane of the plurality of eyelets.

4. The surgical training device of claim 1 wherein the open proximal end includes an insert configured to simulate a sphincter.

5. The surgical training device of claim 1 wherein the open proximal end is closed with an access device.

6. The surgical training device of claim 1 wherein the body is translucent such that light may pass through the body to illuminate the lumen.

7. The surgical training device of claim 1 wherein the pathway is predetermined to define a suture pathway shape encountered in real surgery.

8. The surgical training device of claim 1 wherein the pathway is predetermined and defines a suture pathway shape associated with a surgical procedure on a human organ.

9. The surgical training device of claim 1 further including a base;
    a top cover connected to and spaced apart from the base to define an internal cavity between the top cover and the base;
    at least one aperture, side opening, or a penetrable tissue simulation region for accessing the internal cavity;
    a camera disposed inside the cavity and configured to display video images on a video monitor connected to the camera and located outside of the cavity;
    wherein the model is removably disposed inside the cavity such that the model is substantially obscured from view yet observable via the camera displaying images of the model on the video monitor.

* * * * *